United States Patent
Chou et al.

(10) Patent No.: US 7,606,443 B2
(45) Date of Patent: Oct. 20, 2009

(54) INTERPOLATION METHOD FOR ENLARGING AN IMAGE

(75) Inventors: Chun-Hsien Chou, Taipei (TW); Jen-Chieh Lin, Taipei (TW); Shu-Min Liau, Taipei (TW); Tsung-Hao Lee, Taipei (TW)

(73) Assignee: Tatung Company, Taipei (TW)

( * ) Notice: Subject to any disclaimer, the term of this patent is extended or adjusted under 35 U.S.C. 154(b) by 502 days.

(21) Appl. No.: 11/347,381

(22) Filed: Feb. 6, 2006

(65) Prior Publication Data

US 2007/0053025 A1 Mar. 8, 2007

(30) Foreign Application Priority Data

Sep. 7, 2005 (TW) .............................. 94130667 A

(51) Int. Cl.
*G06T 3/40* (2006.01)
(52) U.S. Cl. ...................................... 382/300; 345/660
(58) Field of Classification Search .................. 345/660
See application file for complete search history.

(56) References Cited

U.S. PATENT DOCUMENTS 5,089,893 A * 2/1992 Iwase .......................... 348/581
5,740,089 A * 4/1998 Menkhoff et al. ........... 708/290
6,961,479 B1 * 11/2005 Takarada ..................... 382/300

OTHER PUBLICATIONS

Fang Xu, Hong Liu, Ge Wang, Bennett A. Alford, Comparison of Adaptive Linear Interpolation and Conventional Linear Interpolation for Digital Radiography Systems, Jan. 2000, Journal of Electronic Imaging, vol. 9 Issue 1, pp. 22-31.*
K.T. Gribbon and D.G. Bailey "A Novel Approach to Real-Time Bilinear Interpolation" Proceedings of the Second IEEE Internationla Workshop on Electronic Design, Test and Applications (DELTA '04), Jan. 28-30, 2004, pp. 126-131.*

* cited by examiner

*Primary Examiner*—Jon Chang
(74) *Attorney, Agent, or Firm*—Bacon & Thomas, PLLC

(57) ABSTRACT

The present invention relates to an interpolation method for enlarging an image, wherein the image is composed of plural scanning lines. Firstly, it selects four adjacent continuous pixels $x_{k-1}$, $x_k$, $x_{k+1}$, and $x_{k+2}$ which have the pixel values $f(x_{k-1})$, $f(x_k)$, $f(x_{k+1})$, and $f(x_{k+2})$ respectively on each of the scanning lines; next, it determines three linear equations $L_{k-1}$, $L_k$, and $L_{k+1}$ according to every two adjacent pixel values $f(x_{k-1})$ and $f(x_k)$, $f(x_k)$ and $f(x_{k+1})$, and $f(x_{k+1})$ and $f(x_{k+2})$, respectively; then, it selects a pixel x to be interpolated between the pixel $x_k$ and the pixel $x_{k+1}$; finally, it applies the pixel x to the three linear equations $L_{k-1}$, $L_k$, and $L_{k+1}$ to determine three candidate pixel values which are weighted and combined to obtain pixel value f(x) of the pixel x.

4 Claims, 3 Drawing Sheets

| f(X-1) | | f($X_{k-1}$) | f($X_k$) | f($X_{k+1}$) | | f($X_n$) | ~ 21
|---|---|---|---|---|---|---|
| 1 | | $X_{k-1}$ | $X_k$ | $X_{k+1}$ | | $X_n$ |

INTERPOLATION METHOD FOR ENLARGING AN IMAGE

BACKGROUND OF THE INVENTION

1. Field of the Invention

The present invention relates to an image interpolation method and, more particularly, to an interpolation method for enlarging an image.

2. Description of Related Art

In an image process to enlarge an image, the image of low-pixel has to be enlarged as an image of high-pixel. The image will become indistinct because of loss to the image information. Moreover, this indistinct image reduces the quality of image. In order to avoid this problem, when the image is proceeding to enlarge, a microprocessor uses an interpolation method, such as B-spline or Bicubic, for interpolating pixels to the image to be enlarged, so as to obtain new pixel values to achieve good vision quality. However, the interpolation operation uses a complex cubic polynomial for calculating interpolated pixels. Thus, when proceeding to enlarge for the image, lots of multipliers and adders are required to implement the interpolation operation. Accordingly, such a great amount of operation not only is disadvantageous for hardware implementation but also spends a lot of computation time. Therefore, it is desirable to provide an improved interpolation method for enlarging an image to mitigate and/or obviate the aforementioned problems.

SUMMARY OF THE INVENTION

The object of the present invention is to provide an interpolation method for enlarging an image, which uses a linear interpolation for obtaining interpolated pixel values so as to significantly reduce the amount of computation, thereby being advantageous to hardware implementation and reducing the cost.

To achieve the object, the present invention provides an interpolation method for enlarging an image, wherein the image is composed of plural scanning lines. The method comprises the steps of: (A) selecting four adjacent continuous pixels $x_{k-1}$, $x_k$, $x_{k+1}$, and $x_{k+2}$ which have the pixel values $f(x_{k-1})$, $f(x_k)$, $f(x_{k+1})$, and $f(x_{k+2})$, respectively, on each of the scanning lines; (B) determining three linear equations $L_{k-1}$, $L_k$, and $L_{k+1}$ according to every two adjacent pixel values $f(x_{k-1})$ and $f(x_k)$, $f(x_k)$ and $f(x_{k+1})$, and $f(x_{k+1})$ and $f(x_{k+2})$, respectively; (C) selecting a pixel x to be interpolated between the pixel $x_k$ and the pixel $x_{k+1}$; (D) applying the pixel x to the three linear equations $L_{k-1}$, $L_k$, and $L_{k+1}$ to determine three candidate pixel values, respectively, which are weighted and combined to obtain pixel value $f(x)$ of the pixel x.

Other objects, advantages, and novel features of the invention will become more apparent from the following detailed description when taken in conjunction with the accompanying drawings.

BRIEF DESCRIPTION OF THE DRAWINGS

FIG. 2 is a schematic view of an image; and

DETAILED DESCRIPTION OF THE PREFERRED EMBODIMENT

Figure 1:
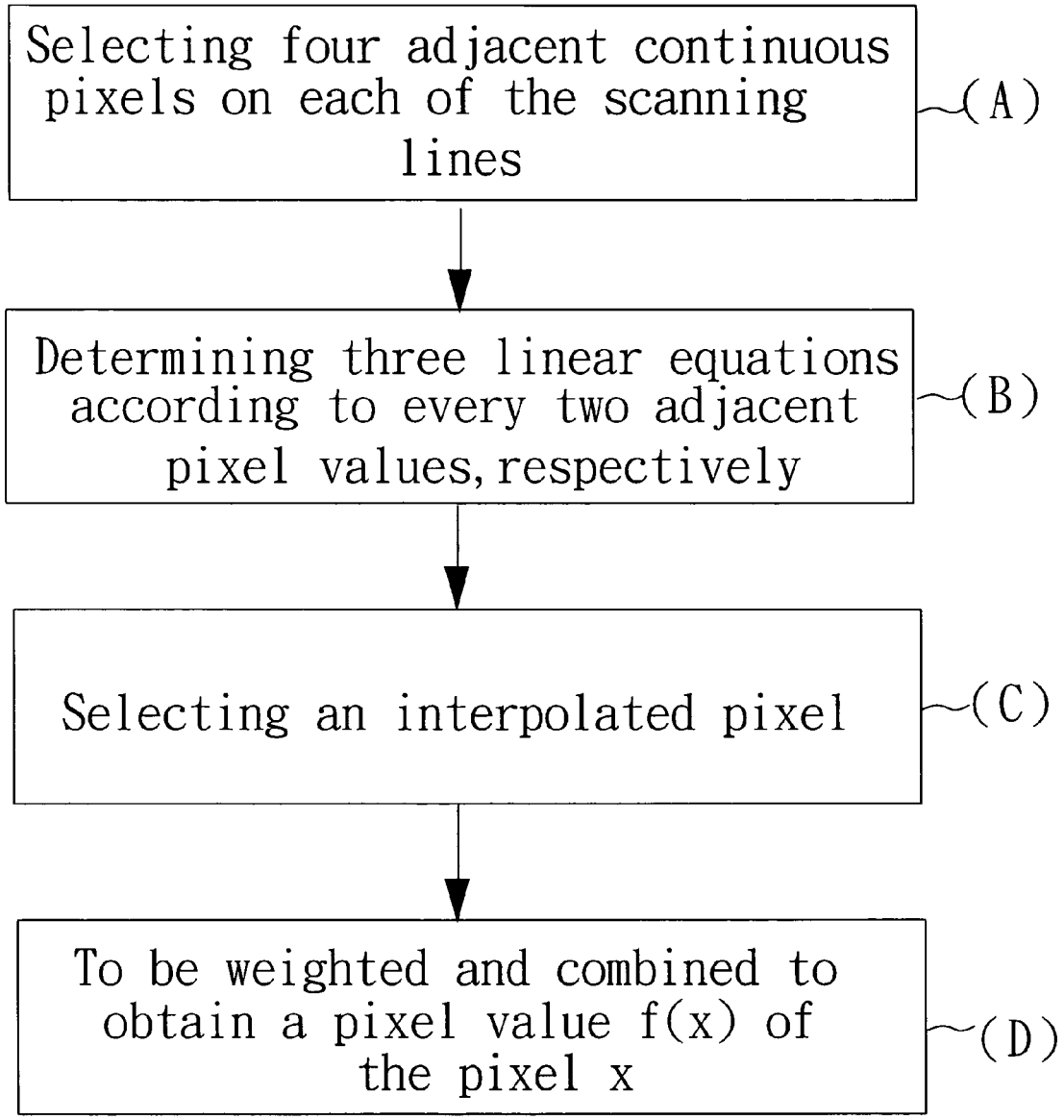
FIG. 1 is a flowchart of interpolation for enlarging an image in accordance with the present invention.

The present invention is an interpolation method for enlarging an image. The steps of the method are shown in FIG. 1. The method of the embodiment will be elaborated in FIG. 2 and FIG. 3.

Figure 2:
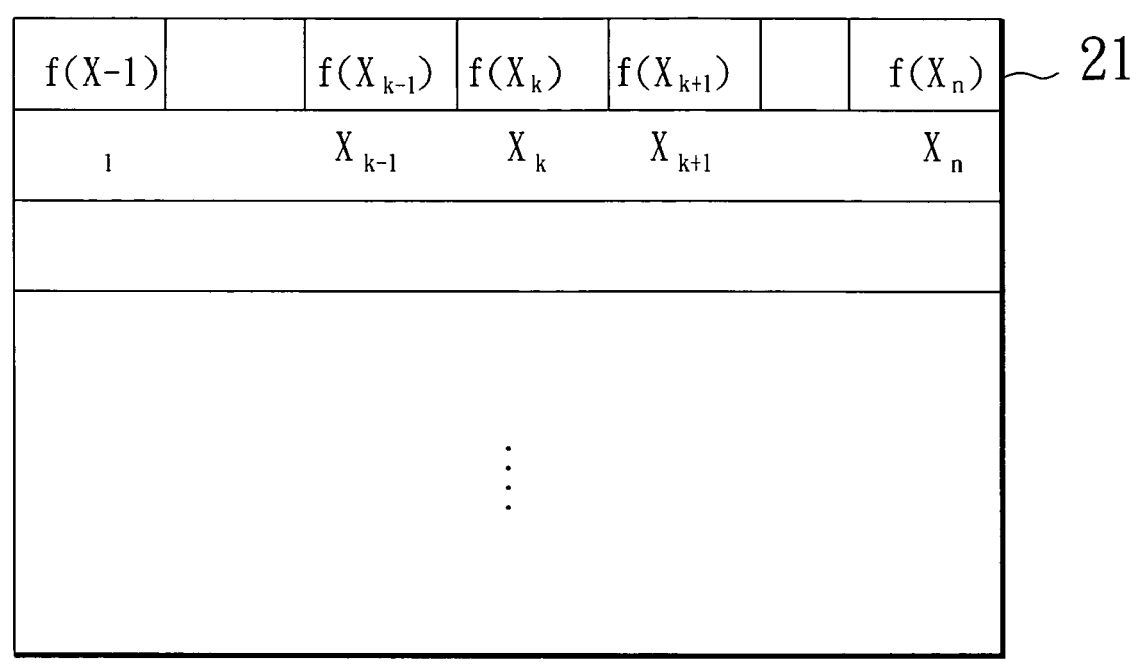

With reference to FIG. 2, there is shown a schematic diagram of an image, wherein the image is composed of plural scanning lines 21. Each of the scanning lines 21 also includes plural pixels $x_1 \sim x_n$. Each of the pixels $x_1 \sim x_n$ has a pixel value. When proceeding to enlarge the image, a microprocessor inserts the interpolated pixels among the pixels $x_1 \sim x_n$ of each scanning line 21 for increasing the number of pixels of the image to achieve effect of enlargement.

Figure 3:
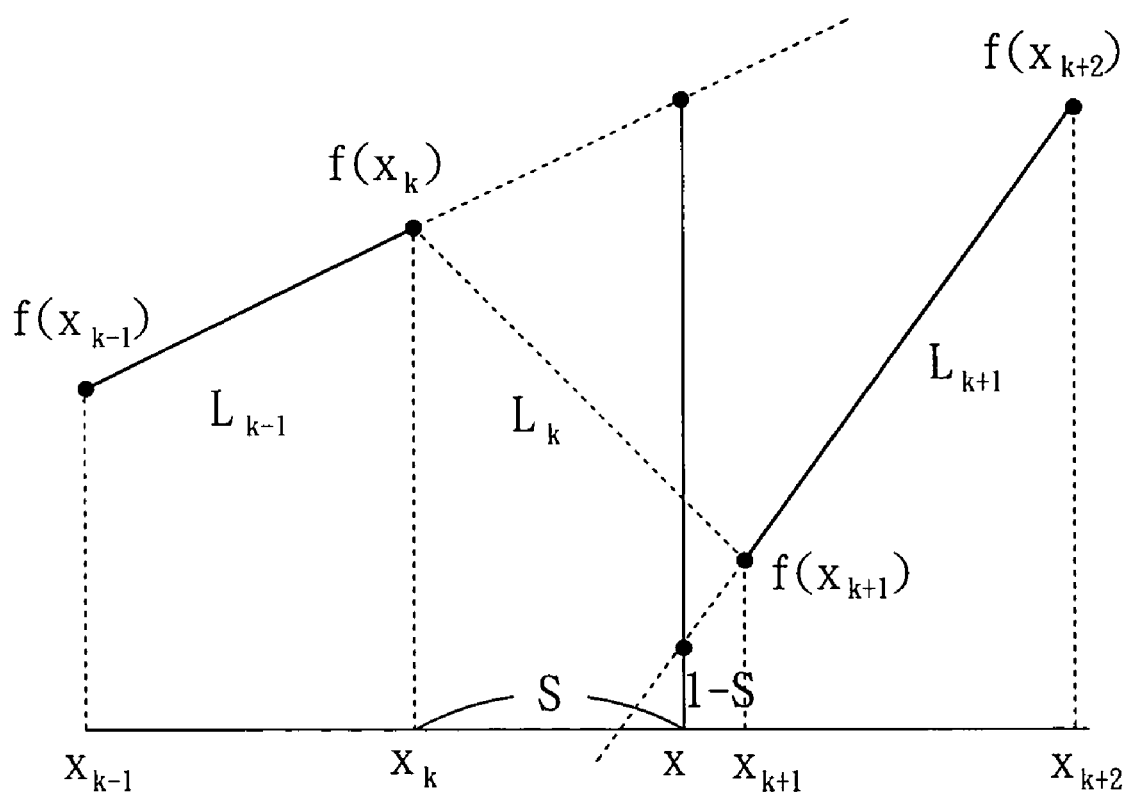
FIG. 3 is a schematic diagram of interpolation for enlarging an image in accordance with the present invention.

Please refer to FIGS. 1 and 3. FIG. 1 shows a flowchart of interpolation method for enlarging an image in accordance with the present invention, and FIG. 3 shows a schematic diagram of the interpolation method for enlarging an image in accordance with the present invention. Firstly, it selects four adjacent continuous pixels $x_{k-1}$, $x_k$, $x_{k+1}$, and $x_{k+2}$ which have the pixel values $f(x_{k-1})$, $f(x_k)$, $f(x_{k+1})$, and $f(x_{k+2})$, respectively, on each of the scanning lines 21 (step A). Next, it determines three linear equations $L_{k-1}$, $L_k$, and $L_{k+1}$ according to every two adjacent pixel values $f(x_{k-1})$ and $f(x_k)$, $f(x_k)$ and $f(x_{k+1})$, and $f(x_{k+1})$ and $f(x_{k+2})$, respectively. Moreover, it computes three slopes, denoted as slope 1, slope 2, and slope 3, for the three linear equations $L_{k-1}$, $L_k$, and $L_{k+1}$, respectively (step B).

Then, it selects a pixel x to be interpolated between the pixel $x_k$ and the pixel $x_{k+1}$, wherein the ratio of a distance from the pixel $x_k$ to the pixel x to a distance from the pixel $(x_k)$ to the pixel $(x_{k+1})$ is s. The ratio of a distance from the pixel x to the pixel $x_{k+1}$ to a distance from the pixel $x_k$ to the pixel $x_{k+1}$ is 1−s (step C). Finally, it applies the pixel x to the three linear equations $L_{k-1}$, $L_k$, and $L_{k+1}$ to determine three candidate pixel values f1, f2 and f3 as follows:

$$f1 = slope1 \times (1-s) + f(x_{k-1}),$$

$$f2 = slope2 \times (1-s) + f(x_k), \text{ and}$$

$$f3 = f(x_{k+1}) - slope3 \times s.$$

These three candidate pixel values f1, f2 and f3 are then weighted by weighting values w1, w2, and w3, respectively, and combined to obtain a pixel value $f(x)$ of the pixel (x) (step D) as follows:

$$f(x) = w1 \times [slope1 \times (1-s) + f(x_{k-1})] + w2 \times [slope2 \times (1-s) + f(x_k)] + w3 \times [f(x_{k+1}) - slope3 \times s],$$

where w1=s/2, w2=½, w3=(1−s)/2, w1+w2+w3=1.

Thus, according to the above steps, it is able to proceed to interpolate and compute the pixel values of the interpolation for the pixel values on each of scanning line. When proceeding to enlarge the image, those pixel values of new interpolation avoid producing an indistinct image thereby maintaining the quality of image. The interpolation method of the present invention uses a simple linear equation for obtaining interpolated pixel values so as to significantly reduce the amount of computation, thereby being advantageous to hardware implementation and reducing the cost.

Although the present invention has been explained in relation to its preferred embodiment, it is to be understood that many other possible modifications and variations can be made without departing from the scope of the invention as hereinafter claimed.

What is claimed is:

1. An interpolation method used by a microprocessor for enlarging an image by inserting pixels into the image, wherein the image is composed of plural scanning lines, the method comprising the steps of:
   (A) selecting four continuously adjacent pixels $x_{k-1}$, $x_k$, $x_{k+1}$, and $x_{k+2}$ which have the pixel values $f(x_{k-1})$, $f(x_k)$, $f(x_{k+1})$, and $f(x_{k+2})$ respectively on each scanning line;
   (B) determining three linear equations $L_{k-1}$, $L_k$, and $L_{k+1}$ according to every two continuously adjacent pixel values $f(x_{k-1})$ and $f(x_k)$, $f(x_k)$ and $f(x_{k+1})$, and $f(x_{k+1})$ and $f(x_{k+2})$;
   (C) selecting a pixel x to be interpolated between the pixel $x_k$ and the pixel $x_{k+1}$; and
   (D) applying the pixel x to the three linear equations $L_{k-1}$, $L_k$, and $L_{k+1}$ to determine three candidate pixel values, respectively, which are weighted and combined to obtain a pixel value f(x) of the pixel x,
   wherein the pixel value f(x) of the pixel x is f(x)=w1×[slope1×(1−s)+f($x_{k-1}$)]+w2×[slope2×(1−s)+f($x_k$)]+w3×[f($x_{k+1}$)−slope3×s], where slope1, slope2, and slope3 are slopes of the linear equations $L_{k-1}$, $L_k$, and $L_{k+1}$, respectively, s is a ratio of a distance from the pixel $x_k$ to the pixel x to a distance from the pixel $x_k$ to the pixel $x_{k+1}$, 1−s is a ratio of a distance from the pixel x to the pixel $x_{k+1}$ to a distance from the pixel $x_k$ to the pixel $x_{k+1}$, and w1, w2, and w3 are the weighting values.

2. The method as claimed in claim 1, wherein the sum of weighting values w1+w2+w3 is 1.

3. The method as claimed in claim 2, wherein the weighting values w1, w2, and w3 are s/2, ½, and (1−s)/2, respectively.

4. The method as claimed in claim 1, wherein the microprocessor inserts interpolated pixels among the pixels $x_1$-$x_n$ of each scanning lines thus increasing the number of pixels of the image.

* * * * *

UNITED STATES PATENT AND TRADEMARK OFFICE
CERTIFICATE OF CORRECTION

PATENT NO. : 7,606,443 B2  Page 1 of 1
APPLICATION NO. : 11/347381
DATED : October 20, 2009
INVENTOR(S) : Chou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twelfth Day of October, 2010

David J. Kappos
*Director of the United States Patent and Trademark Office*